(12) United States Patent
Miyagishima

(10) Patent No.: US 10,819,609 B2
(45) Date of Patent: Oct. 27, 2020

(54) COMMUNICATION RELAY DEVICE AND NETWORK MONITORING METHOD

(71) Applicant: YAMAHA CORPORATION, Hamamatsu-shi (JP)

(72) Inventor: Satoshi Miyagishima, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 42 days.

(21) Appl. No.: 16/157,374

(22) Filed: Oct. 11, 2018

(65) Prior Publication Data

US 2019/0116107 A1    Apr. 18, 2019

(30) Foreign Application Priority Data

Oct. 12, 2017    (JP) ................ 2017-198271

(51) Int. Cl.
*H04L 12/26* (2006.01)
*H04L 12/24* (2006.01)

(52) U.S. Cl.
CPC ...... *H04L 43/0894* (2013.01); *H04L 43/0817* (2013.01); *H04L 43/0888* (2013.01); *H04L 43/10* (2013.01); *H04L 41/0213* (2013.01); *H04L 43/16* (2013.01)

(58) Field of Classification Search
None
See application file for complete search history.

(56) References Cited

U.S. PATENT DOCUMENTS

| 7,693,835 | B2* | 4/2010 | Ohta ............... | H04L 63/12 |
| | | | | 707/999.006 |
| 7,979,571 | B2* | 7/2011 | Dillon ............. | H04L 47/10 |
| | | | | 709/232 |
| 8,068,425 | B2* | 11/2011 | Bugenhagen ..... | H04L 47/11 |
| | | | | 370/235 |
| 8,139,543 | B2* | 3/2012 | Li ................. | H04W 24/04 |
| | | | | 370/332 |
| 8,310,359 | B2* | 11/2012 | Abedi .............. | G06Q 10/04 |
| | | | | 340/539.1 |
| 8,830,833 | B2* | 9/2014 | Bugenhagen ..... | H04L 41/5003 |
| | | | | 370/235 |
| 8,879,391 | B2* | 11/2014 | Bugenhagen ..... | H04L 47/11 |
| | | | | 370/235 |
| 9,137,133 | B2* | 9/2015 | Bugenhagen ..... | H04L 41/5009 |
| 9,258,257 | B2* | 2/2016 | Malik ............. | H04L 49/9063 |
| 9,279,846 | B2* | 3/2016 | Schuster .......... | H02H 7/261 |
| 9,566,836 | B2* | 2/2017 | Hammerschmidt ............. |  |
| | | | | B60C 23/0488 |
| 2016/0316022 | A1* | 10/2016 | Takano ............. | H04L 67/141 |

FOREIGN PATENT DOCUMENTS

JP    2017005598 A    1/2017

* cited by examiner

*Primary Examiner* — Alpus Hsu
(74) *Attorney, Agent, or Firm* — Rossi, Kimms & McDowell LLP

(57) ABSTRACT

A communication relay includes a port configured to be connected to a terminal device, a memory that stores instructions, and a processor that executes the instructions. The instructions cause the processor to perform: referring to a communication rate at the port; measuring the communication rate; and calculating a sampling value indicating a communication state based on the measured communication rate.

15 Claims, 16 Drawing Sheets

COMMUNICATION RELAY DEVICE AND NETWORK MONITORING METHOD

CROSS REFERENCE TO RELATED APPLICATIONS

This application is based on Japanese Patent Application (No. 2017-198271) filed on Oct. 12, 2017, the contents of which are incorporated herein by reference.

BACKGROUND OF THE INVENTION

1. Field of the Invention

The present disclosure relates to a technique for monitoring devices that are connected to a network. One embodiment of the present disclosure relates to a communication relay device and a network monitoring method that have a function of monitoring a network or the like.

2. Description of the Related Art

As a related network monitoring system, JP-A-2017-005598 discloses a monitoring device. In this monitoring device, communications are performed with a device that is installed in the network to which a security camera or a security camera recorder is connected. If results of operation checks cannot be obtained in a prescribed time or longer (disabled communication state), or if such disable communication sates have occurred plural times in a prescribed period, the monitoring device estimates a cause based on regional or environmental factors by comparing responses of the communications with results of operation checks of other devices. Further, the monitoring device sends information on the cause and a current communication state to a designated destination.

SUMMARY OF THE INVENTION

To monitor devices connected to a network, a monitoring device is necessary. One object of the present disclosure is therefore to monitor terminal devices connected to a network regularly and accurately without the need for incorporating an additional device.

A communication relay device according to one embodiment of the present disclosure includes a port configured to be connected to a terminal device, a memory that stores instructions, and a processor that executes the instructions. The instructions cause the processor to perform: referring to a communication rate at the port; measuring the communication rate; and calculating a sampling value indicating a communication state based on the measured communication rate.

Also, a network monitoring method for monitoring a terminal device connected to a port of a communication relay device according to one embodiment of the present disclosure includes: referring to a communication rate at the port; measuring the communication rate; and calculating a sampling value indicating a communication state based on the measured communication rate.

DETAILED DESCRIPTION OF THE EXEMPLARY EMBODIMENTS

Figure 1:
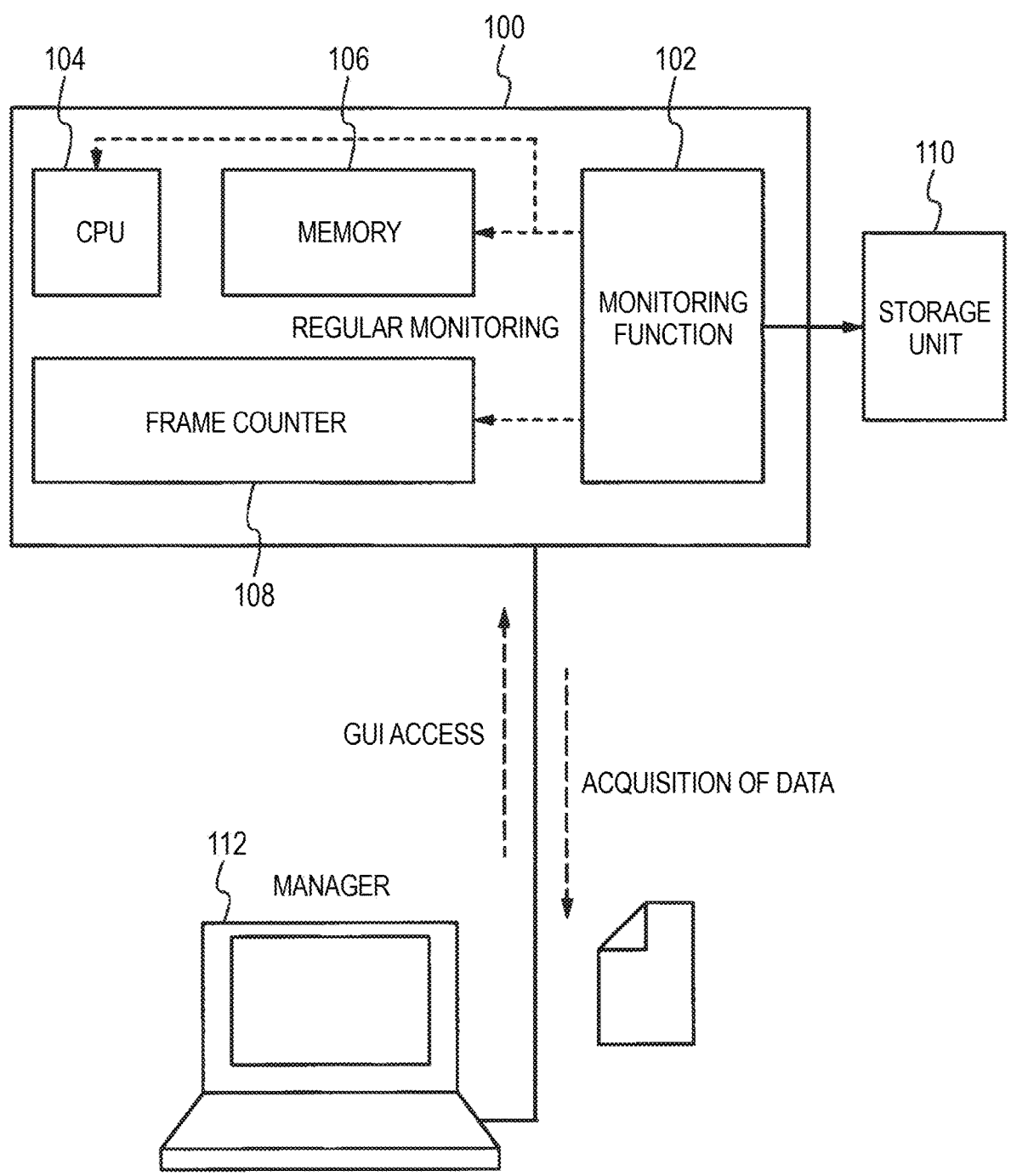
FIG. 1 shows the configuration of a communication relay device according to a first embodiment of the present disclosure.

Embodiments of the present disclosure will be hereinafter described with reference to the drawings. However, the present disclosure includes many different modes and should not be construed as being restricted to the embodiments described below.

The drawings to be referred to in the detailed description of the present disclosure may be drawn schematically for convenience of description and hence the width, thickness, shape, etc. of each element may be different than in actual modes. However, the modes shown in the drawings are just examples and should not be construed as restricting the scope of the present disclosure.

When one particular element shown in a certain drawing is the same as or corresponds to another particular element shown in another drawing, they may be given the same reference numeral (or reference symbols having the same numeral with different suffixes such as "a" and "b") and redundant descriptions may be avoided as appropriate. Furthermore, such terms "first" and "second" in the names of elements are added for convenience to discriminate those elements from each other and have no other meanings unless otherwise specified.

Embodiment 1

FIG. 1 shows the functional configuration of a communication relay device 100 according to a first embodiment of the present disclosure. The communication relay device 100 is used for a network to which computers, communication devices, information devices, etc. are connected, and one or plural terminal devices are connected to it. The communication relay device 100 includes a CPU (central processing unit) 104 and a memory 106 as resources and has a function of controlling the communication states of terminal devices 116 connected to the network. The memory 106 is a semiconductor memory and is, for example, a random access memory. The communication relay device 100 has a monitoring function 102 of monitoring the states of terminal devices connected to it. The monitoring function 102 measures usage rates of such resources as the CPU 104 and the memory 106 and communication rates (traffic rates) acquired by a frame counter 108 and judging, on the basis of these measurement results, whether the terminal devices 116 are in a normal state or have suffered an abnormality.

The monitoring function 102 is also configured to record, in a storage device 110, collected data such as use rates of the resources, communication rates, etc. The storage device 110 may be either incorporated in the communication relay device 100 or provided as an external device and connected to the communication relay device 100. The storage device 110 is a storage medium that allows writing of successive data to itself and can store written data. For example, the storage device 110 is a storage device implemented as a semiconductor memory (also called a solid-state drive), a magnetic disk (also called a hard disk drive), an optical disc, or any of other nonvolatile memory devices or memory circuits. For another example, the storage device 110 may be implemented as a storage area provided by cloud computing.

The communication relay device 100 is connected to a terminal device 112 which belongs to a manager. The network manager sets monitoring setting values (monitoring conditions) for the monitoring function 102 via the terminal device 112. The terminal device 112 may be configured so as to display a setting picture using a GUI (graphic user interface) that uses a web browser to allow the manager to set a monitoring setting value according to the displayed picture. A resource use rate, a data communication throughput, a bandwidth usage rate, or the like is employed as a monitoring setting value and set in the communication relay device 100. An operation to be performed upon occurrence of an abnormality in a terminal device 116 connected to the communication relay device 100 may be set in the communication relay device 100, and can be set by the manager in advance via the terminal device 112.

The communication relay device 100 monitors, regularly, the terminal devices 116 connected to the network by means of the monitoring function 102. The communication relay device 100 has a function of evaluating an acquired measurement value on the basis of the monitoring setting value and, if judging that the measurement value is an abnormal value that is out of the range of a management level, notifying the manager of the occurrence of the abnormality via the terminal device 112. The communication relay device 100 also has a function of performing, upon occurrence of an abnormality, such an operation as stopping or restarting the terminal device 116 according to what is set in advance.

The communication relay device 100 means a network device that is connected to a network that is configured so as to allow electronic devices such as computers, communication devices, and information devices to perform a data communication with each other. For example, the communication relay device 100 includes devices connected to a network such as a wireless access point, a router, and a network switch. The terminal device 112 may be a desktop or notebook personal computer, a multifunctional cellphone device called a tablet terminal or a smartphone, or the like.

Having the monitoring function 102, the communication relay device 100 shown in FIG. 1 can detect and determine whether the terminal devices 116 connected to the network have suffered an abnormality and notify the manager of it. As a result, it is not necessary to provide a device dedicated to monitoring (e.g., SNMP (Simple Network Management Protocol) manager) to monitor the terminal devices 116 connected to the network, whereby the introduction cost can be reduced. That is, the terminal devices 116 connected to the network via the communication relay device 100 can be monitored regularly without the need for incorporating an additional device.

Figure 2:
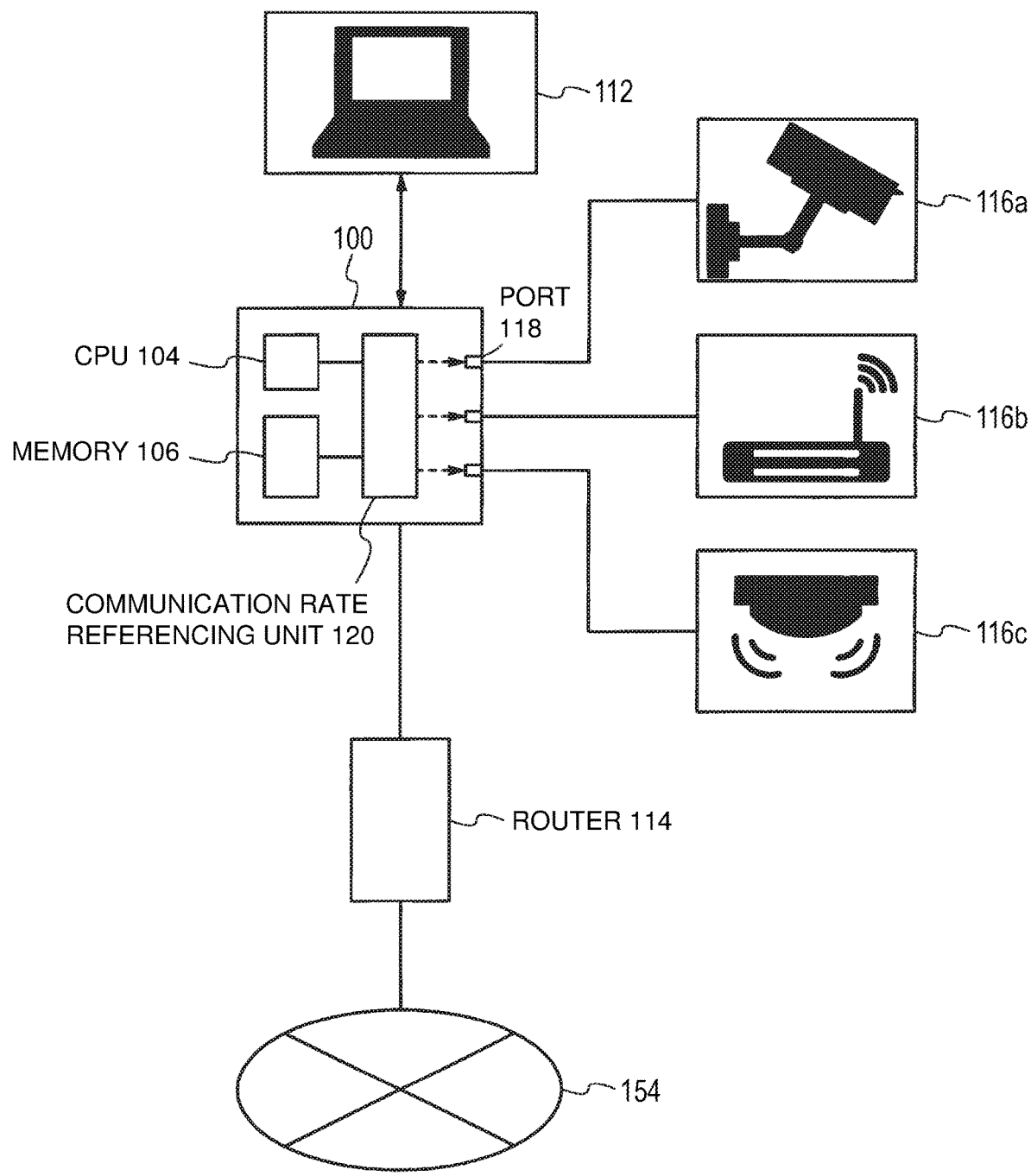
FIG. 2 shows an example network to which the communication relay device according to the first embodiment is connected.

FIG. 2 shows an example network to which the communication relay device 100 is connected. FIG. 2 shows a case that the communication relay device 100 is a network switch. The communication relay device 100 as the network switch is connected to the Internet 154 via a router 114. The communication relay device 100 has plural ports 118 and terminal devices 116 are connected to the respective ports 118.

There are no particular limitations on the terminal devices 116; terminal devices having various functions can be connected to the communication relay device 100. FIG. 2 shows an example mode in which a first terminal device 116a, a second terminal device 116b, and a third terminal device 116c are connected to the communication relay device 100. For example, the first terminal device 116a is a network camera, the second terminal device 116b is a wireless access point, and the third terminal device 116c is a sensor that can be connected to a network. The sensor may be any of various sensors such as an optical sensor, a magnetic sensor, an acceleration sensor, a pressure sensor, and a temperature sensor. These terminal devices 116 are connected to the communication relay device 100 by a network cable or wirelessly. Although not shown in FIG. 2, the communication relay device 100 may be such as to cause multiple connections in such a manner that a tree structure is formed in the network. For example, plural devices such as a computer, a router, and a network switch may be connected together in a multiple manner as terminal devices 116 not shown in FIG. 2.

The communication relay device 100 includes, as hardware resources, the ports 118 connected to the respective terminal devices 116, the CPU 104, the memory 106, etc. (resources). The communication relay device 100 is configured so as to perform a function of controlling a communication with the terminal devices 116 connected to it (first terminal device 116a, second terminal device 116b, and third terminal device 116c), the router 114, and the terminal device 112 using the above hardware resources and software resources incorporated in the communication relay device 100.

The communication relay device 100 shown in FIG. 2 includes a communication rate referencing unit 120. The communication rate referencing unit 120 includes a frame counter, for example, and has a function of measuring communication rates at the respective ports 118. The communication relay device 100 may be connected to the management terminal device 112 either directly or indirectly via the network. Monitoring setting values for the communication relay device 100 are set through the terminal device 112, and information indicating whether an abnormality has occurred is output from the communication relay device 100 to the terminal device 112. The terminal device 112 can read out monitoring data that are accumulated in the communication relay device 100.

Figure 3:
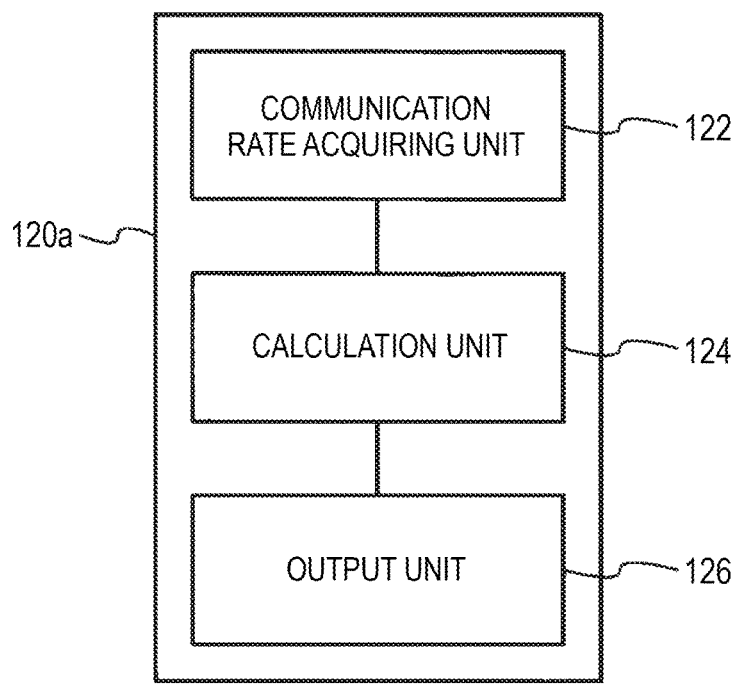
FIG. 3 shows the configuration of a communication rate referencing unit that is included in the communication relay device according to the first embodiment.

FIG. 3 shows the configuration of the communication rate referencing unit 120 (120a). The communication rate referencing unit 120 (120a) includes a communication rate acquiring unit 122, a calculation unit 124, and an output unit 126. The communication rate acquiring unit 122 is a frame counter, for example. The calculation unit 124 is an arithmetic processing circuit. The communication rate acquiring unit 122 measures a communication rate of a data communication that is performed via each port 118. The communication rate acquiring unit 122 measures a communication rate by, for example, counting the number of frames per unit time by a frame counter.

The calculation unit 124 calculates, as a sampling value, a throughput (bps), a bandwidth usage rate (%), or the like on the basis of the communication rate measured by the communication rate acquiring unit 122. The output unit 126 outputs the throughput (bps), the bandwidth usage rate (%), or the like calculated by the calculation unit 124.

The communication relay device 100 performs monitoring using one of the throughput (bps) and the bandwidth usage rate (%) according to a monitoring setting value (monitoring condition). Which of the throughput (bps) and the bandwidth usage rate (%) is to be used is set by the manager.

Figure 4:
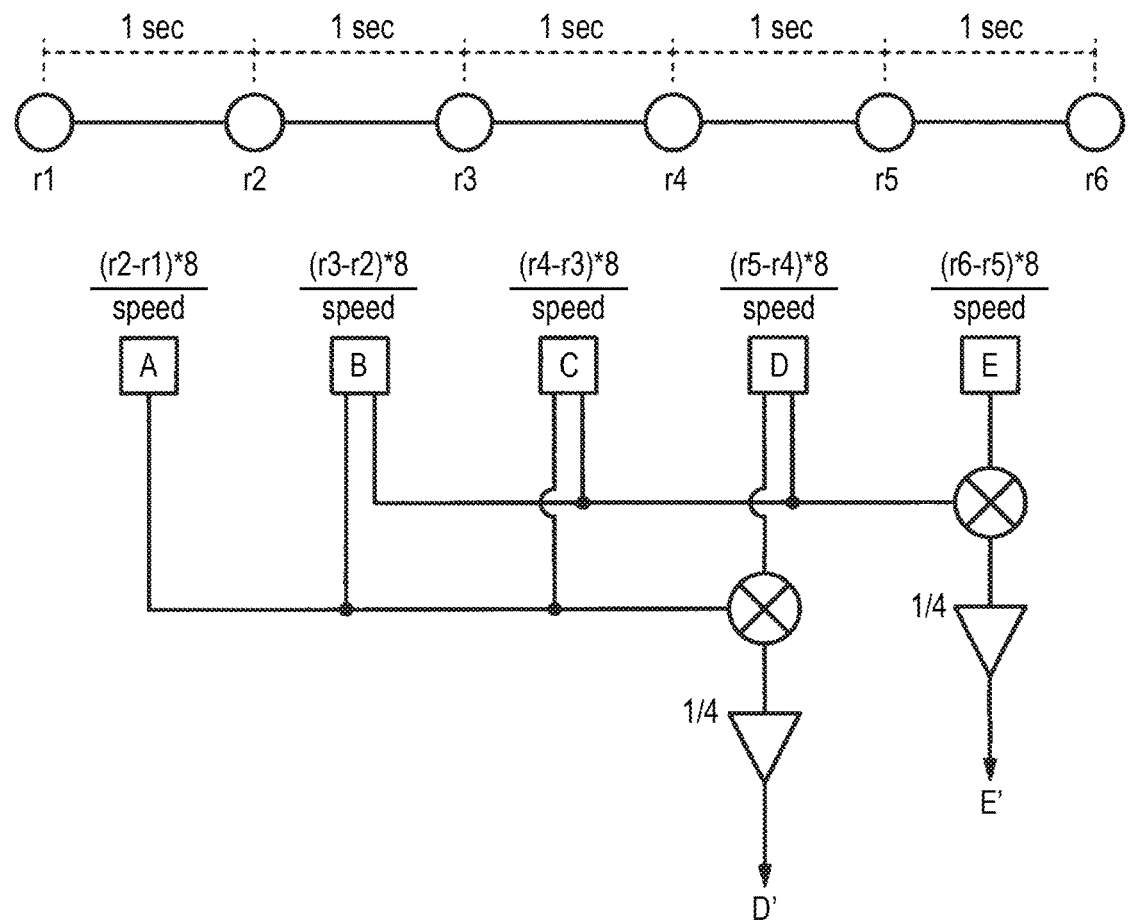
FIG. 4 shows one mode of measurement of a throughput of a communication rate and a bandwidth usage rate by a communication rate acquiring unit of the communication relay device according to the first embodiment.

FIG. 4 shows one mode of monitoring a throughput (%) of a communication rate or a bandwidth usage rate (%) by the communication rate acquiring unit 122. A communication rate of reception data acquired by the communication rate acquiring unit 122 every second is subjected to arithmetic processing by the calculation unit 124, whereby a throughput per second is calculated. As shown in FIG. 4, the calculation unit 124 performs moving average processing using a current reception throughput and reception throughputs at past three time points (four time points in total) and also performs normalization processing. The calculation unit 124 is configured so as to be able to calculate a bandwidth usage rate (%) from a throughput. The communication rate referencing unit 120 can detect not only whether the terminal device 116 connected to each port 118 is alive or dead but also whether the terminal device 116 connected to each port 118 is operating normally.

Figure 5:
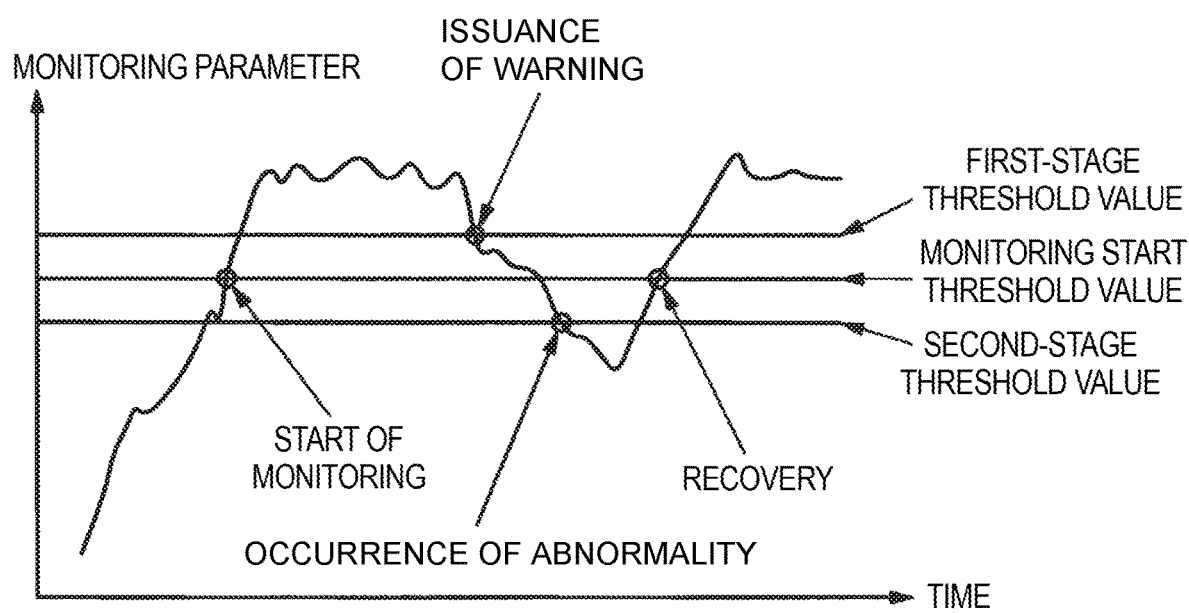
FIG. 5 shows an example of management of the state of a terminal device using three threshold values as management levels in the communication rate acquiring unit of the communication relay device according to the first embodiment.

FIG. 5 shows an example manner of management of the state of a terminal device 116 using three threshold values as monitoring parameter management levels. In the example of FIG. 5, the three threshold values are a monitoring start threshold value, a first-stage threshold value, and a second-stage threshold value. The monitoring start threshold value is a level for judgment as to a start of monitoring of a terminal device 116 and is used such a threshold value that monitoring is started when the sampling level becomes larger than it. The first-stage threshold value is used as such a threshold value that an alarm is issued when the sampling level becomes smaller than it. The second-stage threshold value is used as such a threshold value that it is judged that an abnormality has occurred in a terminal 116 when the sampling level becomes smaller than it.

The threshold values shown in FIG. 5 are just examples and the present disclosure is not limited to them; values as monitoring levels can be set as appropriate according to characteristics of a monitoring target terminal device 116. For example, to monitor a terminal device 116 having a certain function, the communication relay device 100 may select one parameter as a management parameter and perform monitoring using one threshold value. Or the communication relay device 100 may perform monitoring by setting one or plural threshold values for one or plural parameters.

FIG. 5 is a graph schematically showing a mode of a temporal variation of traffic sampling values (throughput (bps) or bandwidth usage rate (%)). The horizontal axis represents time and the vertical axis represents the sampling value. When the sampling value of the communication rate referencing unit 120 becomes larger than the monitoring start threshold value after making an increase, the communication relay device 100 starts monitoring of the terminal device 116 concerned. While the sampling value thereafter varies in such a range as not to become smaller than the first-stage threshold value, the communication relay device 100 judges that the terminal device 116 is operating normally. When the sampling value becomes smaller than the first-stage threshold value, the communication relay device 100 operates, for example, to send a warning to the terminal device 112 of the manager. When the sampling value decreases further and becomes smaller than the second-stage threshold value, the communication relay device 100 judges that an abnormality has occurred in the terminal device 116 and operates, for example, to notify the terminal device 112 of the manager of the occurrence of the abnormality.

At this stage, the communication relay device 100 can perform a recovery operation on the terminal device 116. For example, if the terminal device 116 accommodates a PoE (Power over Ethernet) power supply function, the communication relay device 100 performs processing of restarting the terminal device 116 by stopping and restarting supply of power. This kind of measure that is taken in the event of an abnormality is taken within a range defined by the monitoring setting value that was set by the manager.

When the sampling value thereafter increases (irrespective of whether a recovery operation has been performed) and becomes larger than the monitoring start threshold value, the communication relay device 100 judges that the terminal device 116 has recovered and continues the monitoring.

Although the sampling value variation shown in FIG. 5 is just an example, this monitoring method can be applied to various kinds of terminal devices 116. For example, where the terminal device 116 is a network camera, the throughput and the bandwidth usage rate vary in a prescribed range that is larger than the first-stage threshold value as long as its imaging function is functioning normally. On the other hand, if an abnormality has occurred in the imaging function of the network camera due to a certain cause, the throughput and the bandwidth usage rate decrease. In this case, a conventional network monitoring method using only PING is associated with a problem that although the monitoring target terminal device responds to a PING request, the abnormality cannot be detected if the main function of the terminal device (e.g., the imaging function of a monitoring camera connected to a network) is not in operation.

On the other hand, if threshold values are set so as to define a proper range as in the embodiment, the communication relay device 100 can detect occurrence of an abnormality in the intrinsic function of a terminal device 116. For example, where the terminal device 116 is a network camera, the communication relay device 100 can detect occurrence of an abnormality in its imaging function. In this case, if a scheme to be employed in the event of an abnormality is set, the communication relay device 100 can deal with a failure of the terminal device 116 independently.

The threshold values used as monitoring levels are not limited to the kind described above; the manager can set one or plural ranges as appropriate. The threshold values need not always be fixed values; they may be varied according to one or a combination of the time slot, day of the week, month, season, weather, region, etc. Allowing the communication relay device 100 to change the threshold values in response to an external factor enables precise and accurate monitoring.

The communication relay device 100 according to the embodiment is equipped with the ports 118 to which the respective terminal devices 116 are connected and the communication rate referencing unit 120 for referring to a communication rate at each port 118. The communication rate referencing unit 120 includes the communication rate acquiring unit 122 and the calculation unit 124 for calculating a sampling value indicating a communication state on the basis of a communication rate acquired by the communication rate acquiring unit 122. The monitoring function 102 of the communication relay device 100 is implemented as the communication rate referencing unit 120.

More specifically, the communication relay device 100 has a function of detecting occurrence of an abnormality in the terminal device 116 connected to each port 118 using a throughput or a bandwidth usage rate that is measured on the basis of reception data received through the port 118. For example, if a measured throughput is lower than a certain management level, the communication relay device 100 detects an abnormality that has occurred in the terminal device 116. Or the communication relay device 100 detects that the terminal device 116 is not operating normally if a measured bandwidth usage rate is smaller than a certain management level.

Figure 6:
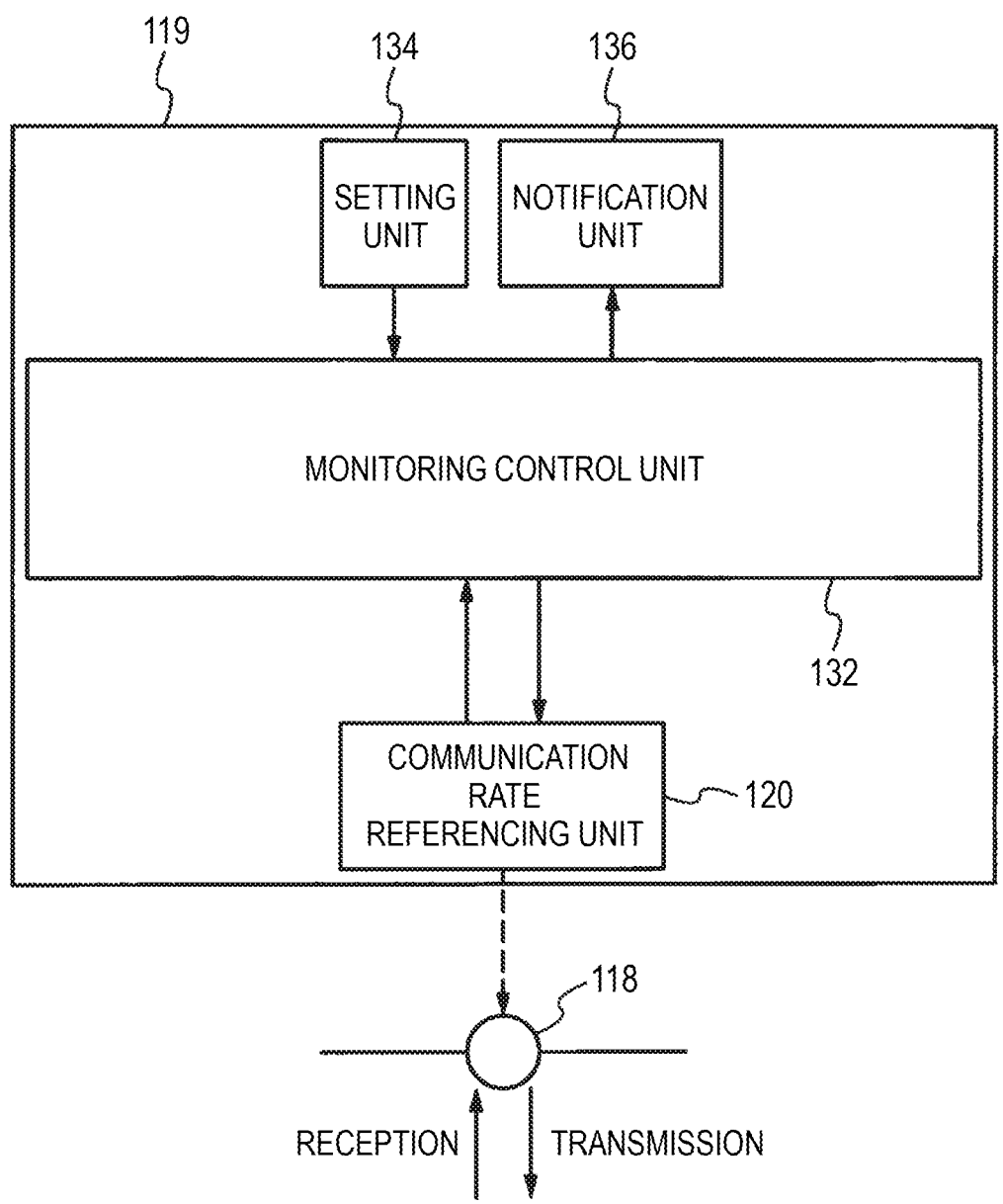
FIG. 6 shows the configuration of a monitoring unit that is included in the communication relay device according to the first embodiment.

FIG. 6 shows a collateral configuration of a monitoring unit 119 for implementing the monitoring function 102 of the communication relay device 100. The monitoring unit 119 includes the communication rate referencing unit 120 for measuring a communication rate at each port 118. The monitoring unit 119 may further include a monitoring control unit 132, a setting unit 134, and a notification unit 136. The setting unit 134 is connected to the terminal device 112 (see FIG. 2) and receives, as data, a monitoring setting value. The monitoring control unit 132 controls the operation of the communication rate referencing unit 120 according to the monitoring setting value that is set in the setting unit 134.

The monitoring control unit 132 judges whether the terminal device 116 connected to each port 118 is operating normally or has suffered an abnormality by comparing output data of the communication rate referencing unit 120 with a monitoring setting value that was set by the setting unit 134. The monitoring control unit 132 has a function of announcing occurrence of an abnormality in the terminal device 116 if detecting it. The notification unit 136 notifies the terminal device 112 (see FIG. 2) of the occurrence of the abnormality using the SMTP (Simple Mail Transfer Protocol) function in the form of an e-mail.

As described above, the communication relay device 100 has the function of detecting occurrence of an abnormality in a terminal device 116 that is connected downstream of the communication relay device 100 in the network and notifies an information processing device such as the terminal device 112 that is connected upstream of the communication relay device 100. With this configuration, it is not necessary to provide a device dedicated to monitoring (e.g., SNMP manager) to monitor the terminal devices 116 connected to the network, whereby the introduction cost can be reduced. Furthermore, the use of the communication relay device 100 makes it possible to monitor the terminal devices 116 all the time without complicating the network.

Figure 7:
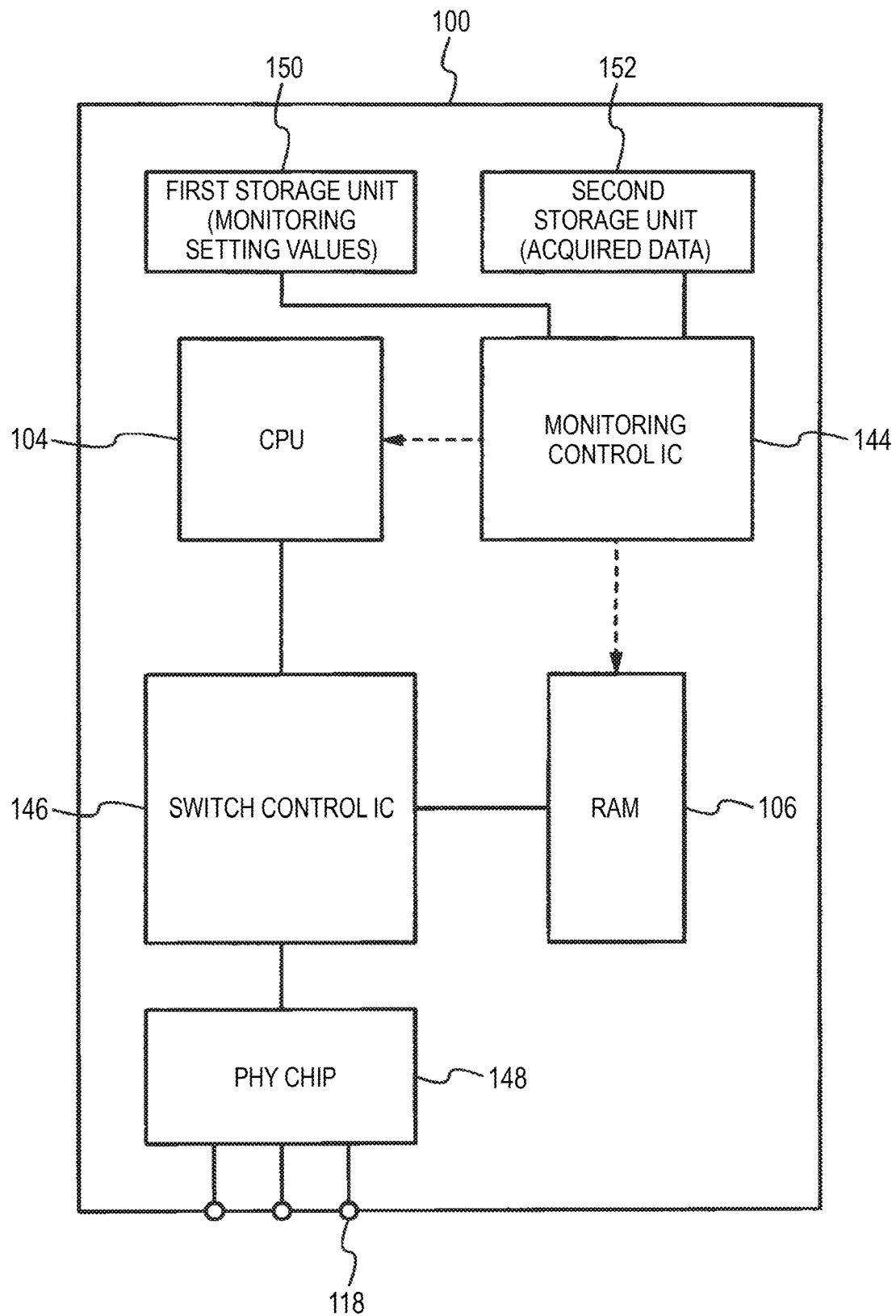
FIG. 7 shows an example hardware configuration of the communication relay device according to the first embodiment.

FIG. 7 shows an example hardware configuration of the communication relay device 100. The communication relay device 100 includes a CPU 104, a memory 106, a switch control IC 146, a monitoring control IC 144, and ports 118. The CPU 104 controls the operation of the switch control IC 146 using route information of the router 114 and the other terminal devices 116. The switch control IC 146 performs relay processing of taking in a frame through a port 118, reading a destination address of the frame, and determines a transmission destination. The memory 106, which is a random access memory, is provided to store frames temporarily. Each port 118 may be provided with a PHY chip (physical layer chip) 148 for converting a logic signal into an electrical signal for actual use.

The monitoring control IC 144 is a device for monitoring the state of each terminal device 116, and the functions shown in FIGS. 3 and 6 are implemented therein in the form of an ASIC (application-specific integrated circuit) or the like. The monitoring control IC 144 may be provided with, as accompanying elements, a first storage unit 150 for storing monitoring setting values (monitoring conditions) and a second storage unit 152 for storing measured sampling values (measurement values). A temporal variation of sampling values may be stored in the second storage unit 152.

Figure 8:
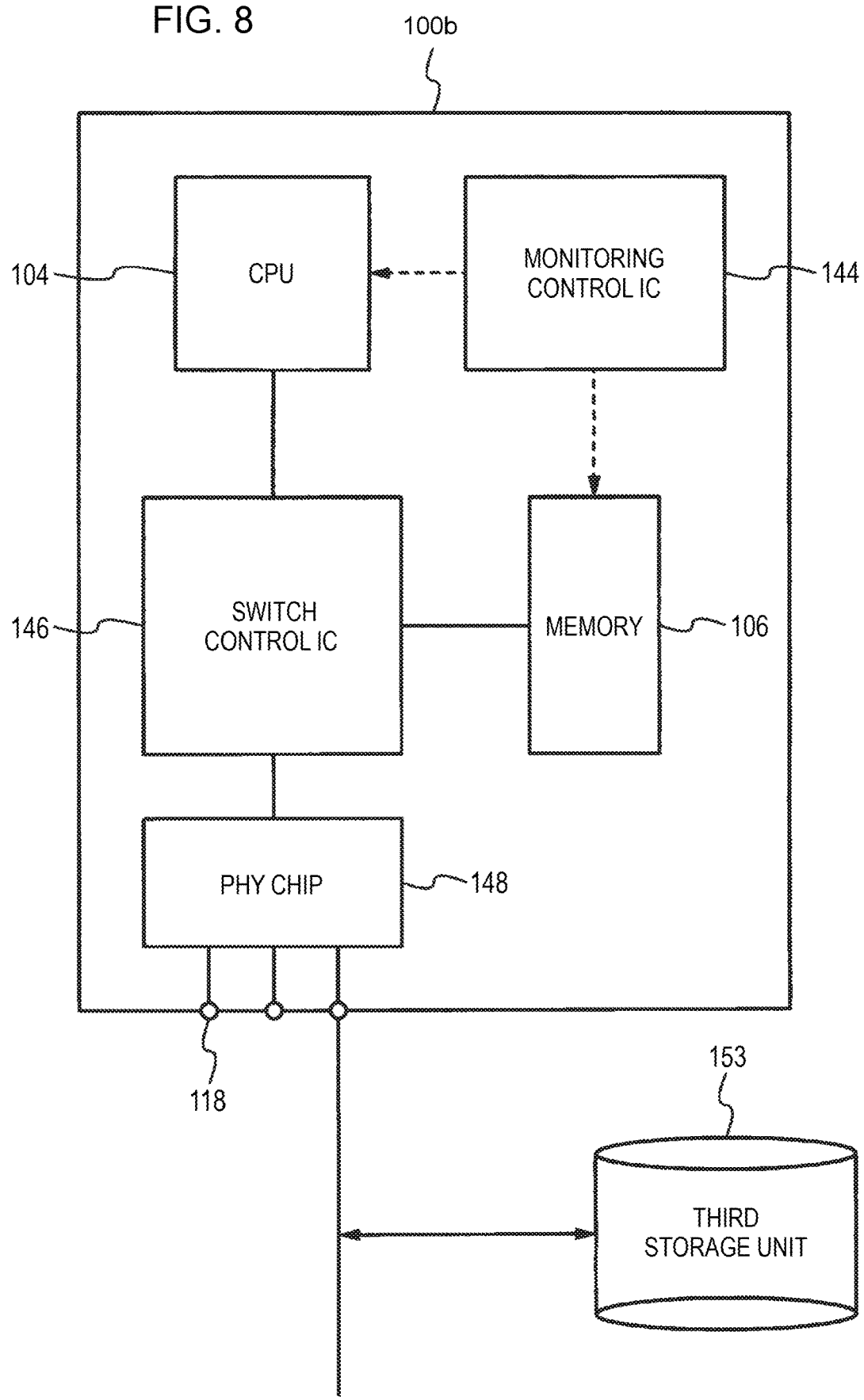
FIG. 8 shows another example hardware configuration of the communication relay device according to the first embodiment.

As shown in FIG. 8, one or both of the first storage unit 150 and the second storage unit 152 may be replaced by a third storage unit 153 which is connected to the communication relay device 100b. In this case, the third storage unit 153 may be connected to the communication relay device 100b either directly or via the network as shown in FIG. 8. Since one or both of the functions (i.e., the function of storing monitoring setting values and the function of storing measurement data) implemented by the first storage unit 150 and the second storage unit 152 are replaced by the function(s) of the third storage unit 153, the configuration of the communication relay device 100b is simplified and its power consumption can be reduced. Furthermore, since the storage capacity for storing monitoring setting values and/or measurement data can be changed when necessary, it becomes possible to adapt flexibly to a change in the content of monitoring and increase or decrease in the number of terminal devices 116 connected to the communication relay device 100b.

As described above, added with the monitoring control IC 144, the communication relay device 100 is given the new function of monitoring the states of the terminal devices 116 connected to it. The functions of the monitoring control IC 144 may be implemented by software. The communication relay device 100 may be configured so that the monitoring function 102 that is implemented by software is performed by the CPU 104. In either case, the communication relay device 100 according to the embodiment can realize the monitoring function 102 in the form of a dedicated IC or software without the need for changing the existing configuration.

Each of the first storage device 150, the second storage device 152, and the third storage device 153 is a storage medium that allows writing of successive data to it and can hold written data, and is a storage device implemented as a semiconductor memory (also called a solid-state drive), a magnetic disk (also called a hard disk drive), an optical disc, or any of other nonvolatile memory devices or memory circuits. The third storage device 153 may be implemented as a storage area provided by cloud computing. For example, the first storage device 150 and the second storage device 152 may be implemented as semiconductor memories and the third storage device 153 may be implemented as a hard disk drive or by cloud computing.

Figure 9:
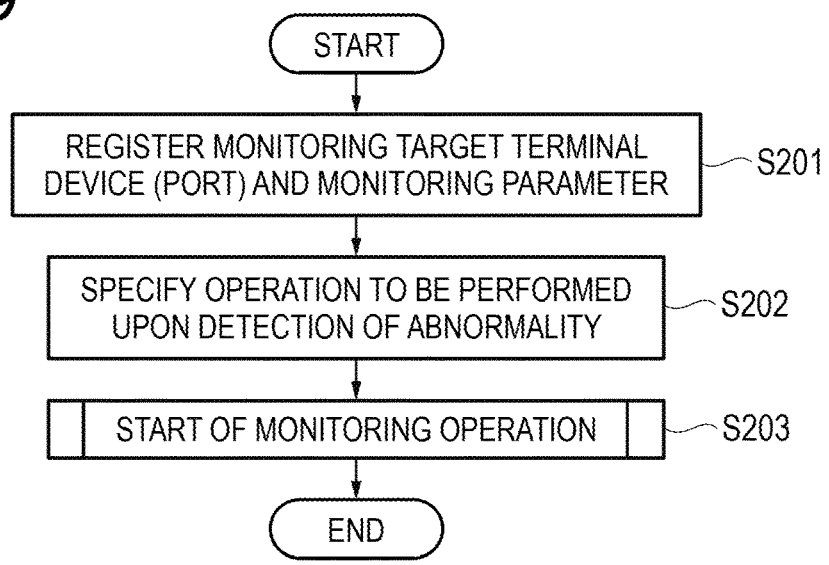
FIG. 9 is a flowchart showing a basic process that is executed by the communication relay device according to the first embodiment.

FIG. 9 shows a basic process that is executed by the communication relay device 100. At step S201, a port 118 of a monitoring target terminal device 116 and a monitoring parameter (throughput or bandwidth usage rate) are registered in the communication relay device 100 through the management terminal device 112. At step S202, an operation to be performed upon detection of an abnormality is specified and registered in the communication relay device 100. At step S203, monitoring of the terminal device 116 by the communication relay device 100 is started.

According to the embodiment, by giving the monitoring function to the communication relay device 100 which is installed in the network, it becomes possible to monitor network devices (terminals devices 116) without the need for introducing additional equipment such as a management manager. This in turn makes it possible to reduce the equipment introduction cost and avoid complication of the network.

Embodiment 2

This embodiment relates to another mode of the communication rate referencing unit 120 described in the first embodiment. Only differences from the first embodiment will be described below.

Figure 10:
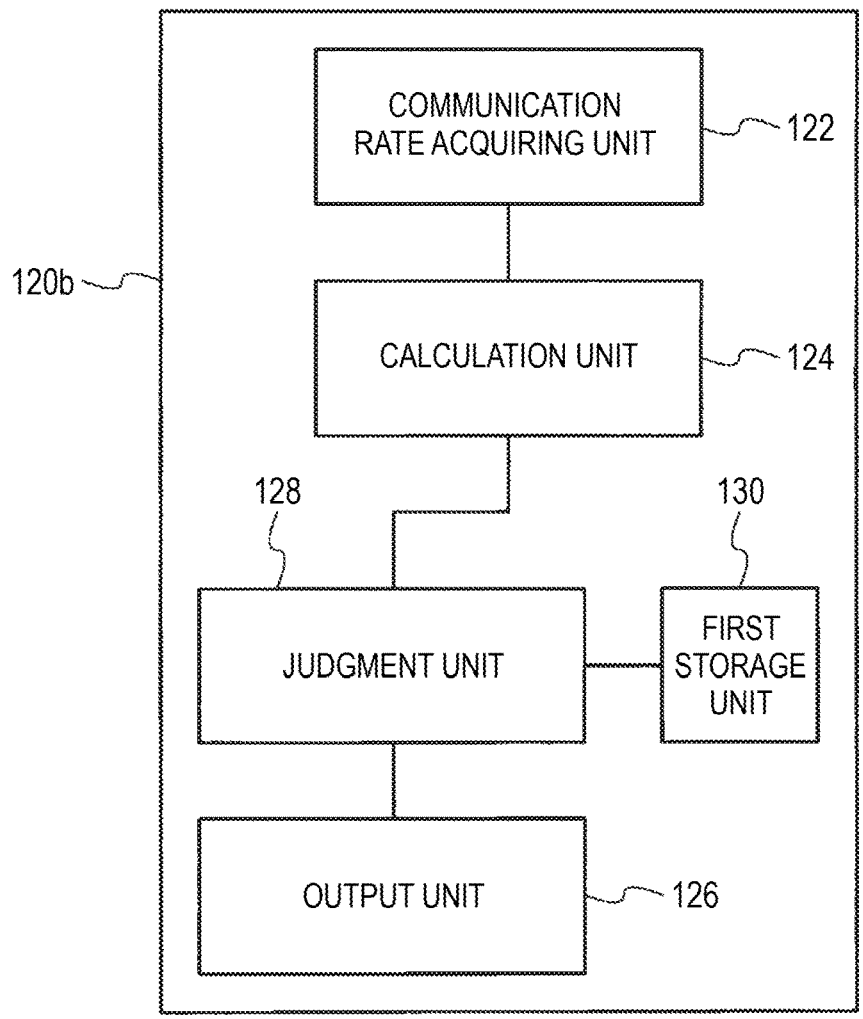
FIG. 10 shows the configuration of a communication rate referencing unit that is included in a communication relay device according to a second embodiment of the present disclosure.

FIG. 10 shows a communication rate referencing unit 120b of another mode for implementing the monitoring function 102. The communication rate referencing unit 120b is equipped with a judgment unit 128 and a first storage unit 130 in addition to the communication rate acquiring unit 122, the calculation unit 124, and the output unit 126. Monitoring setting value information (monitoring condition information) is set in the first storage unit 130. The monitoring setting value information includes a monitoring parameter type, monitoring levels (threshold values), etc., and stored in the first storage unit 130 by the setting unit 134 shown in FIG. 6.

The judgment unit 128 has a function of judging a state of a terminal device 116 by comparing a sampling value calculated by the calculation unit 124 with the monitoring levels. The sampling value judgment result of the judgment unit 128 is output from the output unit 126 to the management terminal device 112. The judgment unit 128 may output an instruction to stop operation of the terminal device 116 when detecting occurrence of an abnormality in the terminal device 116. If the judgment unit 128 detects occurrence of an abnormality in the terminal device 116, the monitoring control unit 132 operates to stop operation of the terminal device 116 on the basis of the stop instruction that is output from the judgment unit 128.

Figure 11:
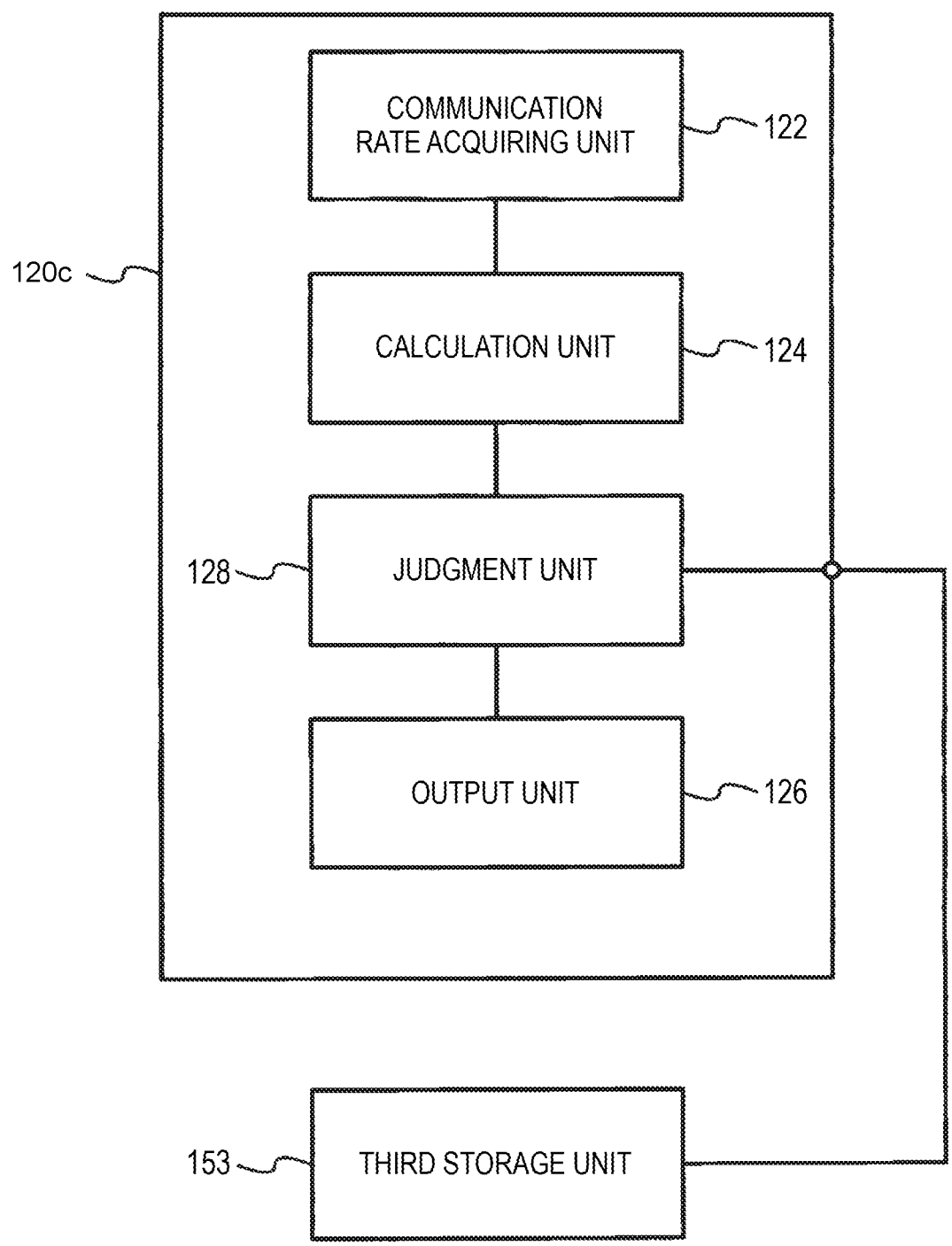
FIG. 11 shows a configuration of another communication rate referencing unit that is included in the communication relay device according to the second embodiment.

As shown in FIG. 11, the function of the first storage unit 130 for storing monitoring setting value information may be implemented by an external third storage unit 153 rather than as the internal function of the communication rate referencing unit 120b. In other words, the function of the first storage unit 130 may be implemented by an external device or an external system that is connected to the communication relay device 100. Providing the function of the first storage unit 130 outside the communication rate referencing unit 120c makes it possible to simplify the configuration of the communication relay device 100 and thereby reduce its power consumption. Furthermore, the same makes it possible to change the storage capacity for storing monitoring setting value information etc. when necessary and hence to adapt flexibly to a change in the content of monitoring and increase or decrease in the number of terminal devices 116 connected to the communication relay device 100.

According to this embodiment, since the communication rate referencing unit 120b includes the judgment unit 128 and the first storage unit 130, the monitoring function 102 can be implemented as one module. The part, other than the communication rate referencing unit 120b, of the configuration of the communication relay device 100 according to this embodiment is the same as in the first embodiment, and hence this embodiment can provide the same advantages as the first embodiment.

Embodiment 3

This embodiment relates to another mode of the monitoring unit 119 described in the first embodiment. Only differences from the first embodiment will be described below.

Figure 12:
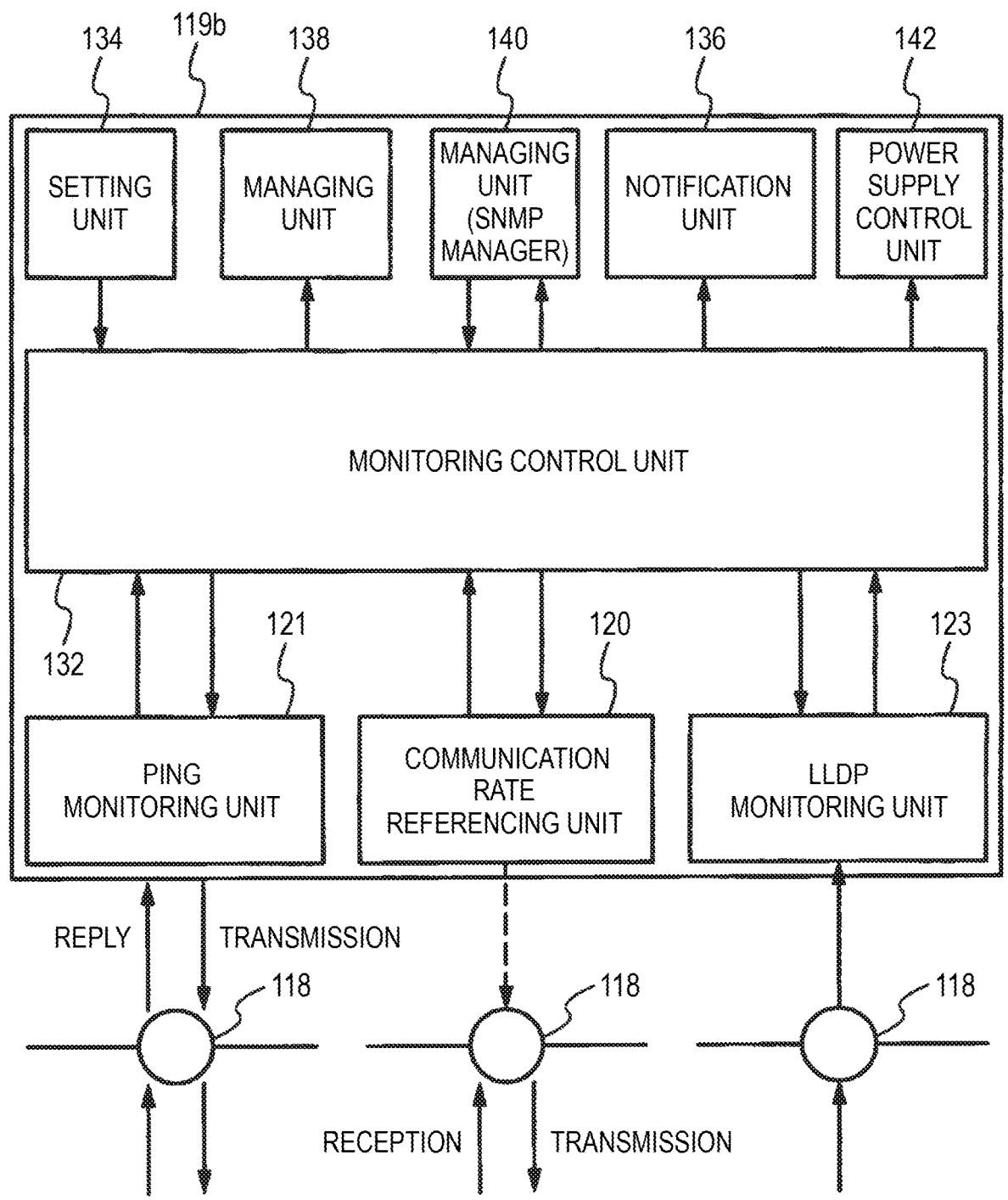
FIG. 12 shows the configuration of a monitoring unit that is included in a communication relay device according to a third embodiment of the present disclosure.

FIG. 12 shows a collateral configuration of a monitoring unit 119b for implementing the monitoring function 102 of the communication relay device 100. The monitoring unit 119b includes a PING monitoring unit 121 for monitoring the network using PING (Packet Internet Groper) and an LLDP (Link Layer Discovery Protocol) monitoring unit 123 in addition to the communication rate referencing unit 120, the setting unit 134, and the notification unit 136. The monitoring unit 119 further includes a layer-2 level (data link layer) management unit 138, an SNMP management unit 140, and a PoE power supply control unit 142. The communication rate referencing unit 120 may be either of the communication rate referencing unit 120a described in the first embodiment or the communication rate referencing unit 120b described in the second embodiment.

The PING monitoring unit 121 has a function of monitoring whether each terminal device 116 is alive or dead. The PING monitoring unit 121 diagnoses each terminal device 116 using PING. The PING monitoring unit 121 transmits, at a constant cycle, an ICMP (Internet Control Message Protocol) echo request to each terminal device 116. If a terminal device 116 is operating normally, the PING monitoring unit 121 receives a reply (ICMP echo response) to the ICMP echo request. At this time, the PING monitoring unit 121 judges whether an ID that was set at the time of the transmission is set in an ID field of an ICMP header contained in the reply and whether a sequence number that set at the time of the transmission is set in a sequence field of the ICMP header. Since it is necessary to confirm that a normal operation is being performed, the PING monitoring unit 121 counts the number of times of success of communication confirmation using an ICMP echo message, the number of times of occurrence of a timeout, and the number of times of occurrence of an error. Whether each terminal device 116 is alive or dead is detected by performing the above operation regularly at a prescribed interval.

The LLDP monitoring unit 123 performs monitoring by receiving a frame containing information relating to each terminal device 116. The LLDP monitoring unit 123 monitors the state of each terminal device 116 using a TTL (time to live) which is an item indispensable for LLDP frame data in the layer-2 level data link layer. For example, if not receiving an LLDP frame that should be transmitted from a terminal device 116 in a TTL time that is set in an LLDP frame, the LLDP monitoring unit 123 can judge that an abnormality has occurred in the terminal device 116. The operation of the LLDP monitoring unit 123 is controlled by the managing unit 140. The managing unit 138 manages occurrence/non-occurrence of trouble in each terminal device 116 using a trap received by the LLDP monitoring unit 123.

The monitoring unit 119b shown in FIG. 12 includes both of the PING monitoring unit 121 and the LLDP monitoring unit 123, this embodiment is not limited to this case. The communication relay device 100 may be added with only one of the PING monitoring unit 121 and the LLDP monitoring unit 123.

Figure 13:
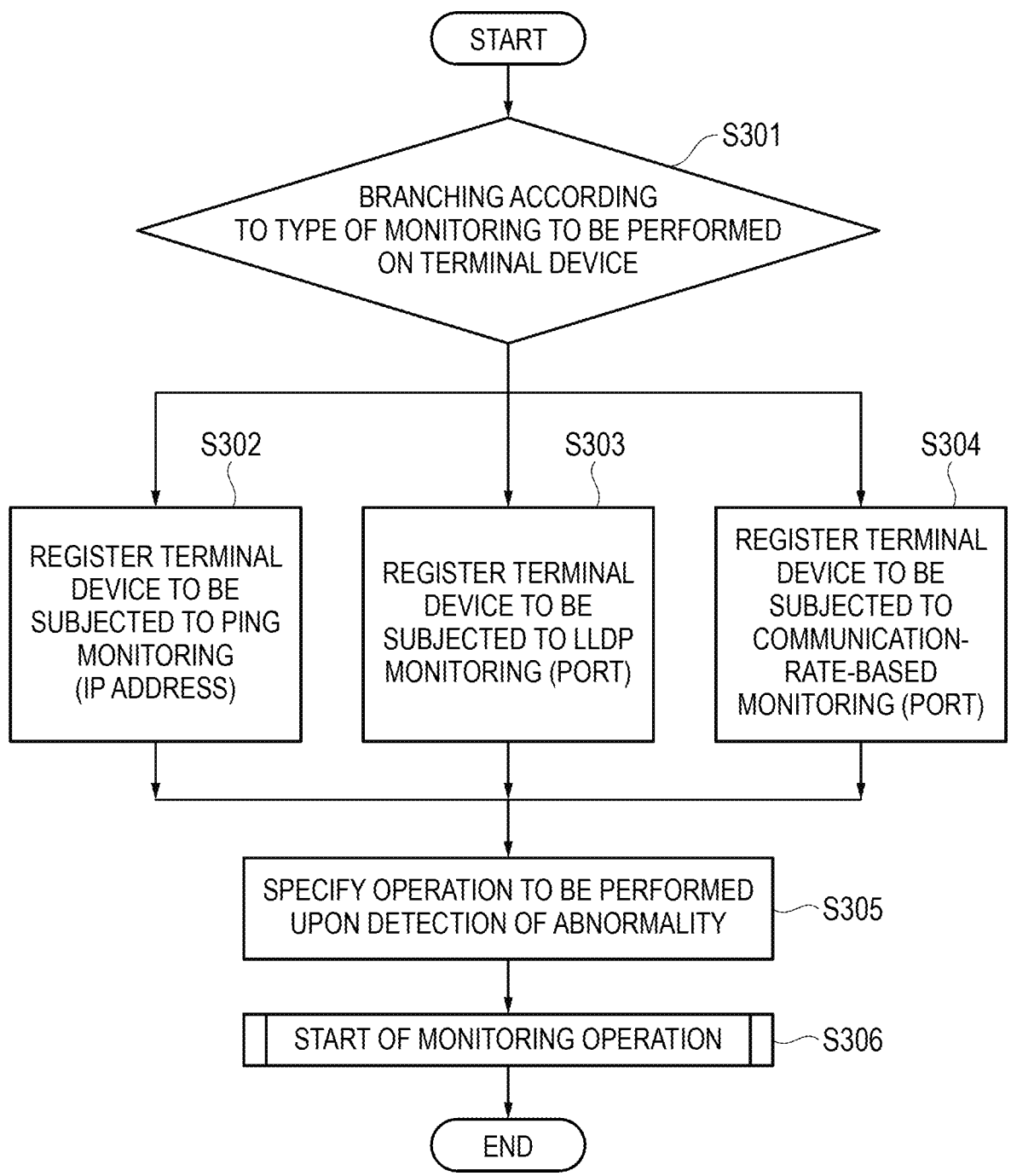
FIG. 13 is a flowchart showing a basic process that is executed by the communication relay device according to the third embodiment.

FIG. 13 shows a basic process that is executed by the communication relay device 100. First, at step S301, a type of a monitoring method to be performed on a terminal device 116 is selected. For the monitoring target terminal device 116, one or plural ones of steps S302, S303, and S304 are executed. At step S302, PING monitoring is selected and an IP address is registered. At step S303, LLDP monitoring is selected and a port 118 is registered. At step S304, communication-rate-based monitoring is selected and a port 118 is registered. It is possible to set all of PING monitoring, LLDP monitoring, and communication-rate-based monitoring. At step S305, an operation to be performed upon detection of an abnormality is specified and registered in the communication relay device 100. At step S306, monitoring of the terminal device 116 by the communication relay device 100 is started.

Figure 14:
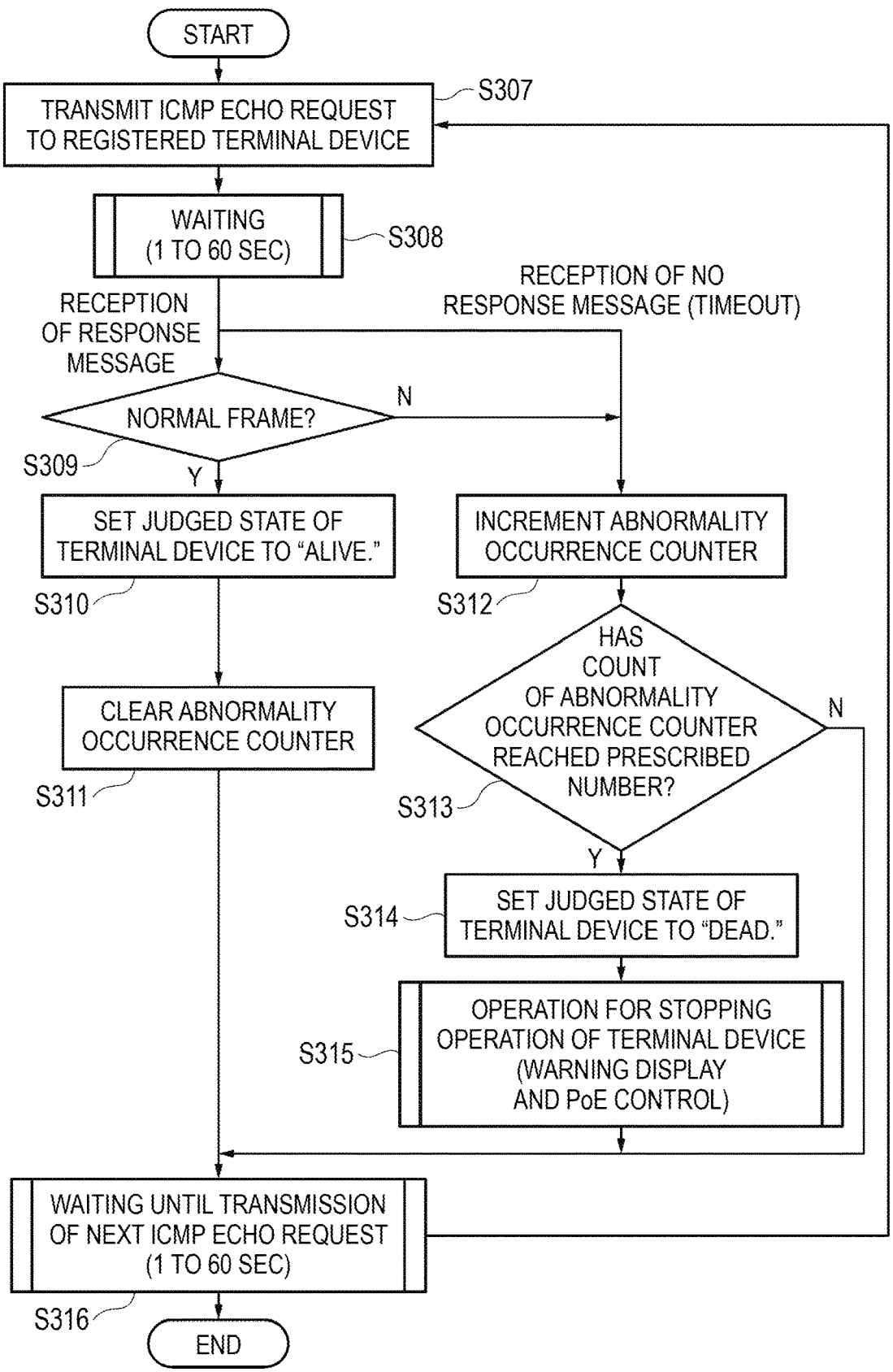
FIG. 14 is a flowchart showing a process that is executed by the communication relay device according to the third embodiment in the case of PING monitoring.

FIG. 14 shows a process that is executed in the case of PING monitoring. At step S307, the communication relay device 100 transmits an ICMP echo request to a registered terminal device 116. At step S308, the communication relay device 100 waits for a response from the terminal device 116 for a prescribed time (e.g., 1 to 60 sec). The manager can set a proper wait time. If the communication relay device 100 does not receive a response message that should be received from the terminal device 116 in the prescribed time (timeout), the process moves to step S312.

If receiving a response message (ICMP echo response) from the terminal device 116, at step S309 the communication relay device 100 judges whether the response message is a normal message. If judging that the response message is a normal message, at step S310 the communication relay device 100 sets the judged state of the terminal device 116 to "alive." At step S311, the communication relay device 100 sets the number of times of occurrence of an abnormality at an initial value ("0"). At step S316, the communication relay device 100 waits until a lapse of a prescribed time to transmission of the next ICMP echo request and returns to step S307. The manager can set a proper wait time.

If judging that the response message received from the terminal device 116 is not a normal message, at step S312 the communication relay device 100 increments the number of times of occurrence of an abnormality. At step S313, the communication relay device 100 judges whether the number of times of occurrence of an abnormality has reached a prescribed number. The communication relay device 100 moves to step S316 if the judgment result is negative, and to step S314 if affirmative.

If judging that the number of times of occurrence of an abnormality has reached the prescribed number, the communication relay device 100 sets the judged state of the terminal device 116 to "dead" at step S314 and performs an operation for stopping the operation of the terminal device 116 at step S315. More specifically, the communication relay device 100 causes the management terminal device 112 to display a warning message and performs a power supply control (PoE control) on the terminal device 116. Then, at step S316, the communication relay device 100 waits until a lapse of the prescribed time to transmission of the next ICMP echo request and returns to step S307. The PING monitoring is carried out by execution of the above process.

Figure 15:
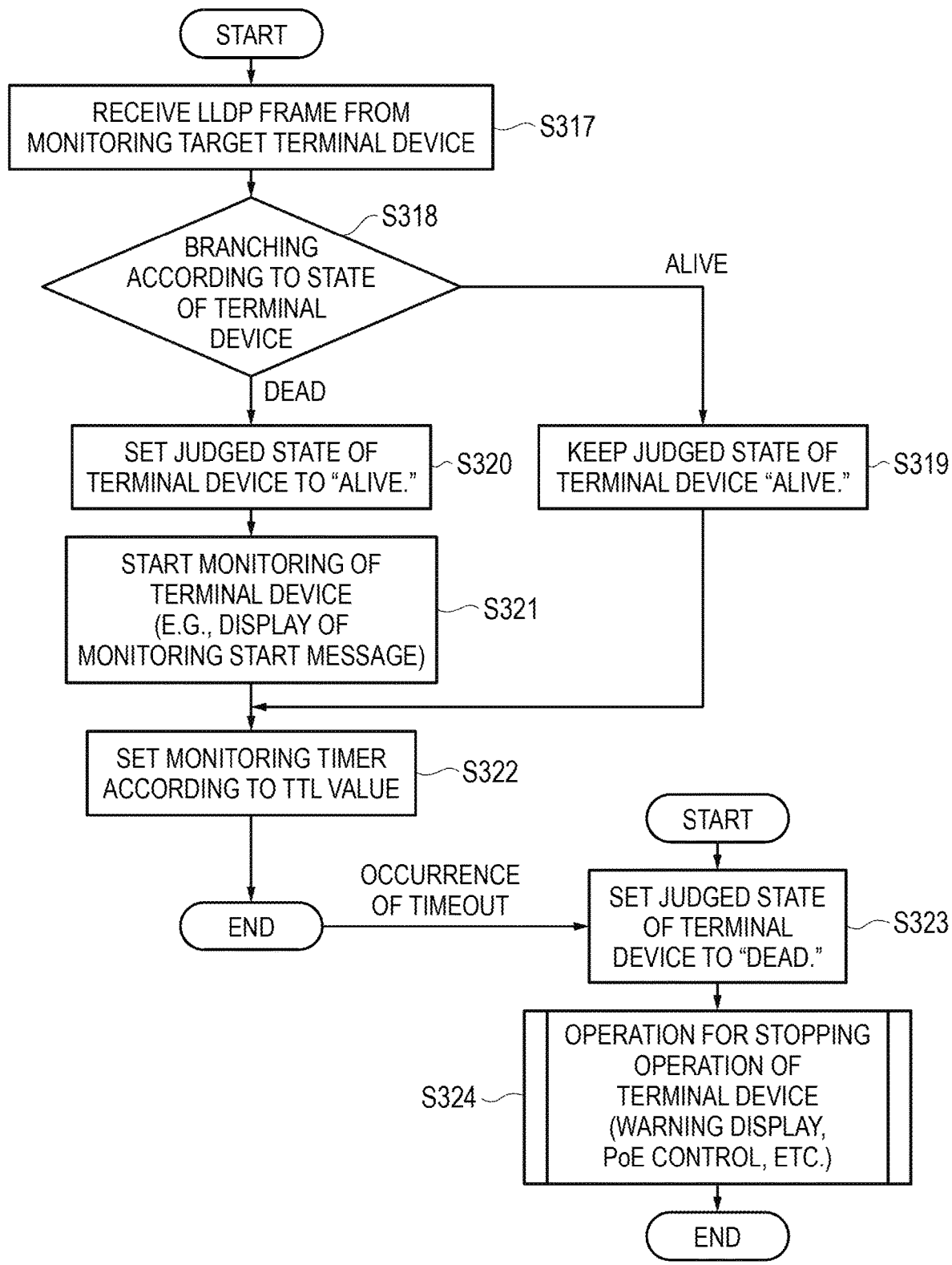
FIG. 15 is a flowchart showing a process that is executed by the communication relay device according to the third embodiment in the case of LLDP monitoring.

FIG. 15 is a process that is executed in the case of LLDP monitoring. At step S317, the communication relay device 100 receives an LLDP (Link Layer Discovery Protocol) frame from a monitoring target terminal device 116. If receiving an LLDP frame from the monitoring target terminal device 116 that has been alive (the judgment result at step S318 is "alive"), at step S319 the communication relay device 100 keeps the judged state of the terminal device 116 "alive." At step S322, the communication relay device 100 sets a monitoring timer according to a TTL (time to live) value.

If receiving an LLDP frame from the terminal device 116 that has been dead (the judgment result at step S318 is "dead"), the communication relay device 100 sets the judged state of the terminal device 116 to "alive" at step S320 and starts monitoring it at step S321. In starting monitoring of the terminal device 116, the communication relay device 100 may cause the management terminal device 112 to display a monitoring start message. At step S322, the communication relay device 100 sets the monitoring timer according to a TTL value.

If receiving no LLDP frame even after a lapse of the time that is set by the monitoring timer, at step S323 the communication relay device 100 sets the judged state of the terminal device 116 to "dead." At step S324, the communication relay device 100 performs an operation for stopping the operation of the terminal device 116. More specifically, the communication relay device 100 causes the management terminal device 112 to display a warning message and performs a power supply control (PoE control) on the terminal device 116. The LLDP monitoring is carried out by execution of the above process. For example, the notification unit 136 causes the management terminal device 112 to display a warning message and the power supply control unit 142 performs a power supply control on the terminal device 116.

Figure 16:
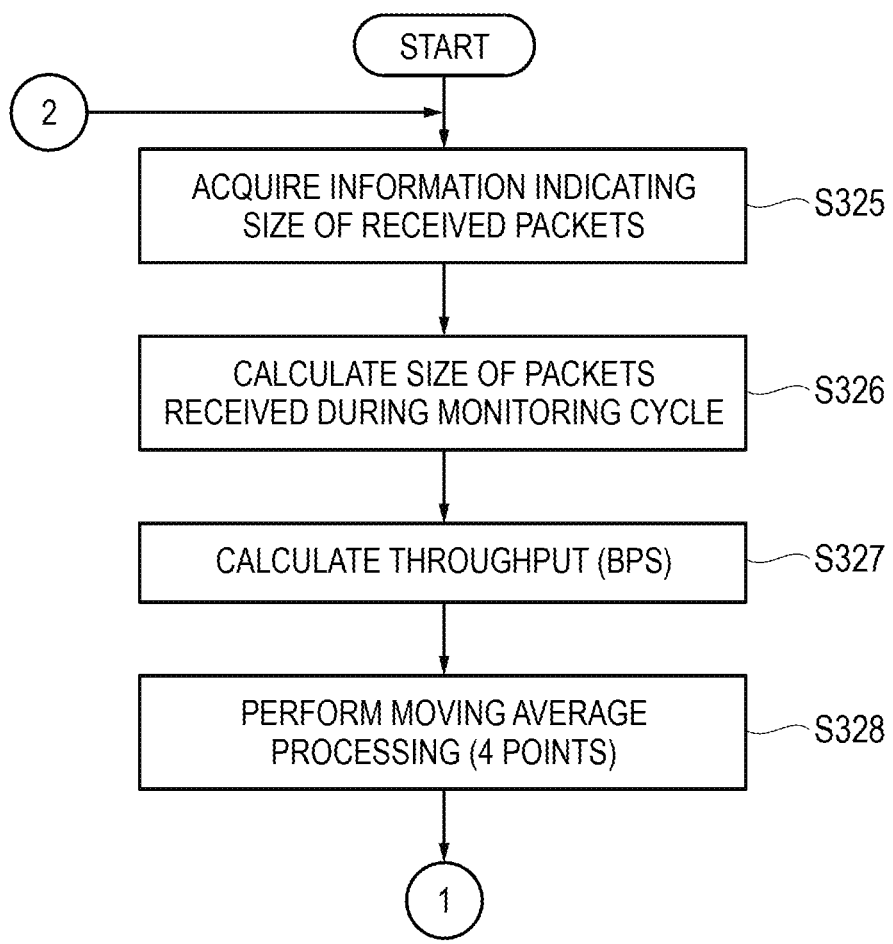
FIG. 16 is a flowchart showing part of a monitoring process that is executed by the communication relay device (communication rate referencing unit) according to the third embodiment.
Figure 17:
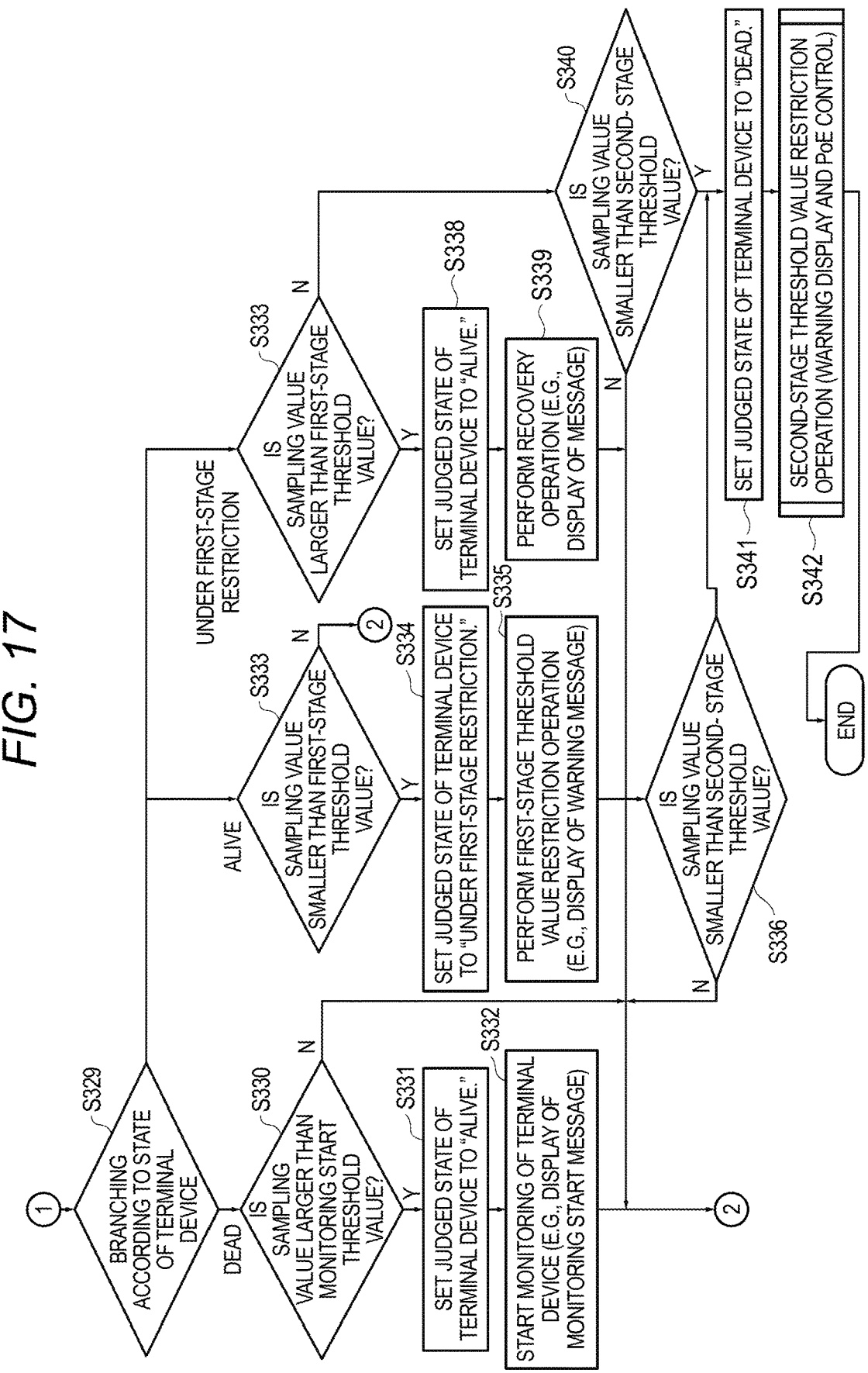
FIG. 17 is a flowchart showing the other part of the monitoring process that is executed by the communication relay device according to the third embodiment.

FIGS. 16 and 17 show a monitoring process that is executed by the communication relay device 100 (communication rate referencing unit 120). At step S325, the communication rate referencing unit 120 receives a frame and acquires information indicating a size of packets contained in the frame. At step S326, the communication rate referencing unit 120 calculates a size of packets that have been received in a set sampling period. The communication rate referencing unit 120 calculates a throughput at step S327 and performs moving average processing at step S328. A sampling value is determined by these steps.

Then, as shown in FIG. 17, at step S329, the process branches depending on the state of the terminal device 116, that is, whether the terminal device 116 is not monitored yet, the sampling value is smaller than a first-stage threshold value, or the sampling value is larger than the first-stage threshold value.

If the terminal device 116 is not monitored yet, the communication relay device 100 judges at step S330 whether the sampling value is larger than a monitoring start threshold value. If the sampling value is not larger than the monitoring start threshold value, the communication relay device 100 returns to step S325 and continues the sampling of a communication rate. If judging at step S330 that the sampling value is larger than the monitoring start threshold value, the communication rate referencing unit 120 sets the judged state of the terminal device 116 to "alive" at step S331 and starts monitoring it at step S332.

At step S333, the communication relay device 100 judges whether the sampling value of the terminal device 116 being monitored is smaller than the first-stage threshold value. If judging at step S333 that the sampling value is not smaller than the first-stage threshold value, the communication relay device 100 returns to step S325 to continue the sampling of a communication rate. If judging at step S333 that the sampling value is smaller than the first-stage threshold value, the communication relay device 100 sets the judged state of the terminal device 116 to "under first-stage restriction" at step S335 and performs a first-stage threshold value restriction operation (e.g., display of a warning message) at step S335.

At step S336, the communication relay device 100 judges whether the sampling value is smaller than a second-stage threshold value. If judging at step S336 that the sampling value is not smaller than the second-stage threshold value, the communication relay device 100 returns to step S325 to continues the monitoring. On the other hand, if judging at step S336 that the sampling value is smaller than the second-stage threshold value, the communication relay device 100 sets the judged state of the terminal device 116 to "dead" at step S341 and makes a transition to a second-state threshold value restriction operation (step S342). The second-state threshold value restriction operation includes causing the management terminal device 112 to display a warning message and performing a power supply control (PoE control) on the terminal device 116. For example, the notification unit 136 causes the management terminal device 112 to display a warning message and the power supply control unit 142 performs the power supply control on the terminal device 116.

While performing the first-stage threshold value restriction operation, at step S337 the communication relay device 100 judges whether the sampling value is larger than the first-stage threshold value. If judging at step S337 that the sampling value is larger than the first-stage threshold value, the communication relay device 100 sets the judged state of the terminal device 116 to "alive" at step S338 and performs a recovery operation at step S339. The recovery operation performed by the communication relay device 100 includes causing the management terminal device 112 to display a message and other actions. Then the communication relay device 100 returns to step S325 to continue the monitoring.

On the other hand, if judging at step S337 that the sampling value is not larger than the first-stage threshold value, then the communication relay device 100 judges at step S340 whether the sampling value is smaller than the second-stage threshold value. If judging at step S340 that the sampling value is not smaller than the second-stage threshold value, the communication relay device 100 returns to step S325 to continue the monitoring.

On the other hand, if judging at step S340 that the sampling value is smaller than the second-stage threshold value, the communication relay device 100 sets the judged state of the terminal device 116 to "dead" at step S341 and makes a transition to the second-stage threshold value restriction operation (step S342).

Figure 18:
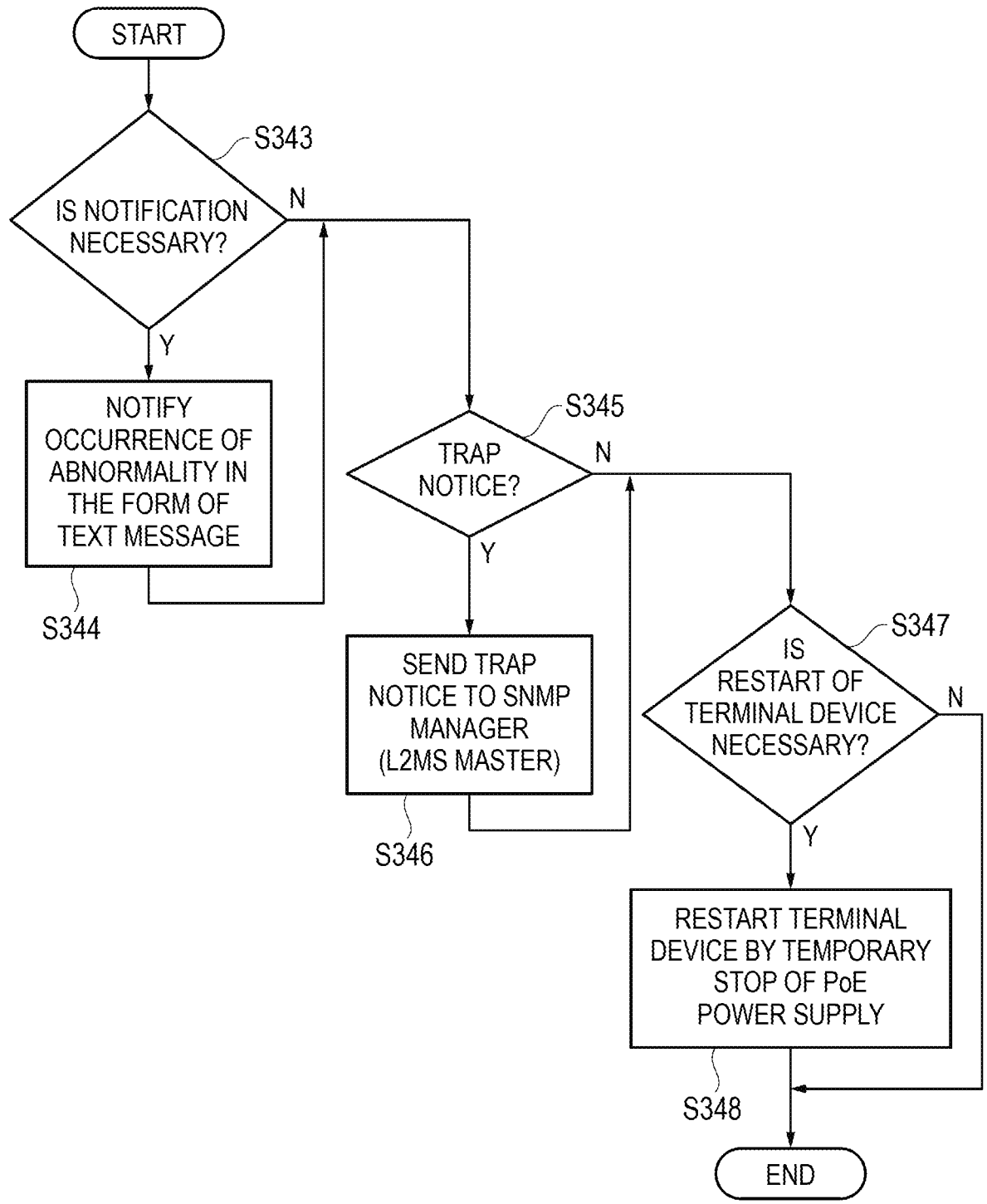
FIG. 18 is a flowchart showing a process that is executed by the communication relay device according to the third embodiment when occurrence of an abnormality in a terminal device is detected.

FIG. 18 shows a process that is executed by the communication relay device 100 when occurrence of an abnormality in a terminal device 116 is detected. First, at step S343, the communication relay device 100 (e.g., monitoring control unit 132) judges whether notification of the occurrence of the abnormality is necessary. If judging that notification of the occurrence of the abnormality is necessary, at step S344 the communication relay device 100 notifies the management terminal device 112 of the occurrence of the abnormality in the form of a text message, for example. The notification is made by an SMTP function of the notification unit 136.

Subsequently, at step S345, the communication relay device 100 judges whether the abnormality was detected through a trap notice transmitted from the terminal device 116. Also if judging at step S343 that notification of the occurrence of the abnormality is not necessary, the communication relay device 100 judges at step S345 whether the abnormality was detected through a trap notice transmitted from the terminal device 116.

If it is judged at step S345 that the abnormality was detected through a trap notice, at step S346 the trap notice is sent to the managing unit (SNMP manager) 140. As a result, the managing unit 140 can detect occurrence of certain trouble in the terminal device 116. At step S347, the communication relay device 100 judges whether restart of the terminal device 116 is necessary. Also if judging at step S345 that the abnormality was detected not through a trap notice, the communication relay device 100 judges at step S347 whether restart of the terminal device 116 is necessary.

If judging at step S347 that restart the terminal device 116 is necessary, at step S348 the communication relay device 100 performs processing for restarting the terminal device 116. For example, restart is made by the power supply control unit 142's stopping the supply of power to the PoE device temporarily. If judging at step S347 that restart the terminal device 116 is not necessary, the communication relay device 100 finishes the process for dealing with the abnormality.

As described above, according to this embodiment, since the PING monitoring unit 121 and the LLDP monitoring unit 123 are provided in addition to the communication rate referencing unit 120, each terminal device 116 connected to the network can be monitored more precisely.

The communication relay device 100 according to this embodiment can be used in such a manner that the functions of the communication rate referencing unit 120, the PING monitoring unit 121, and the LLDP monitoring unit 123 are combined in a desired manner. For example, by monitoring a terminal device 116 using the communication rate referencing unit 120 and the PING monitoring unit 121, whether the main function of the terminal device 116 (e.g., the imaging function in the case of a camera or the temperature measuring function in the case of a temperature sensor) is operating normally can be judged while alive/dead monitoring of the terminal device 116 is performed.

Furthermore, a trap that is transmitted from a terminal device 116 can be received by monitoring the terminal device 116 using the communication rate referencing unit 120 and the LLDP monitoring unit 123. This enables more dynamic and precise monitoring.

What is claimed is:

1. A communication relay device comprising:
   a first storage unit configured to store a monitoring setting value;
   a port configured to be connected to a terminal device;
   a memory that stores instructions; and
   a processor that executes the instructions,
   wherein the instructions, when executed by the processor, cause the processor to:
   measure a communication rate at the port connected to the terminal device;
   calculate a sampling value indicating a communication state based on the measured communication rate at the port connected to the terminal device; and
   judge a state of the terminal device connected to the port by comparing the sampling value calculated based on the measured communication rate at the port connected to the terminal device with the monitoring setting value,
   wherein the first storage unit is configured to store, as the monitoring setting value, a monitoring start threshold value for causing a start of monitoring of the terminal device in a case where the sampling value becomes larger than the monitoring start threshold value, a first threshold value for causing notification of a warning in a case where the sampling value becomes smaller than the first threshold value, and a second threshold value for causing notification of an abnormality of the terminal device in a case where the sampling value becomes smaller than the second threshold value.

2. The communication relay device according to claim 1, wherein the sampling value is at least one of a throughput and a bandwidth usage rate.

3. The communication relay device according to claim 1, wherein the sampling value includes a bandwidth usage rate; and
   wherein the instructions cause the processor to perform:
   judging whether the terminal device is operating normally based on the bandwidth usage rate.

4. The communication relay device according to claim 1, further comprising:
   a second storage unit configured to store a temporal variation of the sampling value.

5. The communication relay device according to claim 1, wherein a temporal variation of the sampling value is stored in a third storage unit and is connected, via a network, to the communication relay device; and
   wherein the instructions cause the processor to perform:
   referring the temporal variation of the sampling value stored in the third storage unit.

6. The communication relay device according to claim 1, wherein the instructions cause the processor to perform:
   setting the monitoring setting value; and
   controlling the judging operation by the set monitoring setting value.

7. The communication relay device according to claim 6, wherein the instructions cause the processor to perform:
   conducting a power supply control which outputs an instruction to stop an operation of the terminal device when it is judged that the state of the terminal device is in abnormality.

8. The communication relay device according to claim 1, wherein the instructions cause the processor to perform:
   notifying a management terminal device of an abnormality of the terminal device when it is judged that the state of the terminal device is in abnormality.

9. The communication relay device according to claim 1, wherein the instructions cause the processor to perform at least one of:
   monitoring an alive/dead state of the terminal device; and
   acquiring information relating to the terminal device and monitoring the terminal device.

10. The communication relay device according to claim 1, wherein the communication relay device is a network switch device.

11. A network monitoring method for monitoring a terminal device connected to a port of a communication relay device, comprising:
    measuring a communication rate at the port connected to the terminal device;
    calculating a sampling value indicating a communication state based on the measured communication rate at the port connected to the terminal device; and
    judging a state of the terminal device connected to the port by comparing the sampling value calculated based on the measured communication rate at the port connected to the terminal device with a monitoring setting value,
    wherein the monitoring setting value includes a monitoring start threshold value for causing a start of monitoring of the terminal device in a case where the sampling value becomes larger than the monitoring start threshold value, a first threshold value for causing notification of a warning in a case where the sampling value becomes smaller than the first threshold value, and a second threshold value for causing notification of an abnormality of the terminal device in a case where the sampling value becomes smaller than the second threshold value.

12. The network monitoring method according to claim 11, wherein the sampling value is at least one of a throughput and a bandwidth usage rate.

13. The network monitoring method according to claim 11, wherein the sampling value includes a bandwidth usage rate; and
    the network monitoring method further comprising:
    judging whether the terminal device is operating normally based on the bandwidth usage rate.

14. The network monitoring method according to claim 11, further comprising:
    setting the monitoring setting value; and
    controlling the judging operation by the set monitoring setting value.

15. The network monitoring method according to claim 11, further comprising:
    notifying a management terminal device of an abnormality of the terminal device when it is judged that the state of the terminal device is in abnormality.

* * * * *